July 2, 1968     D. A. STALBERGER     3,390,838
TWO-PIECE TORCH TIP
Filed Jan. 10, 1966
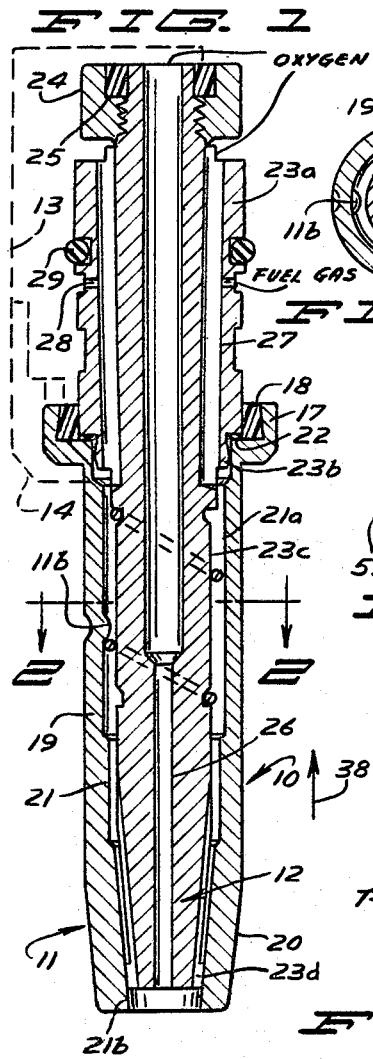
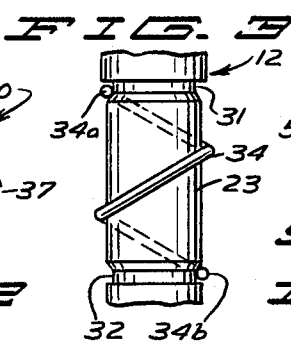
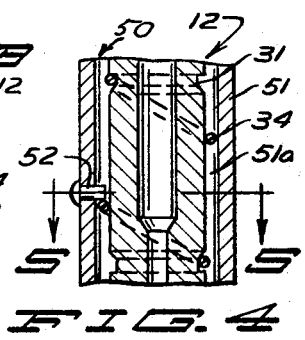
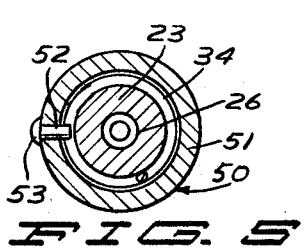
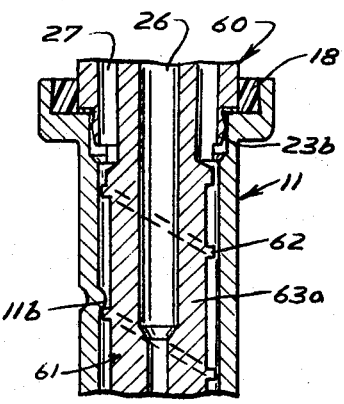
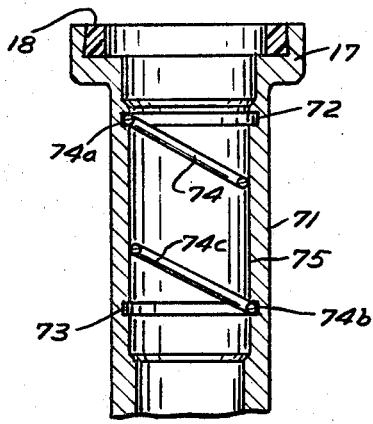
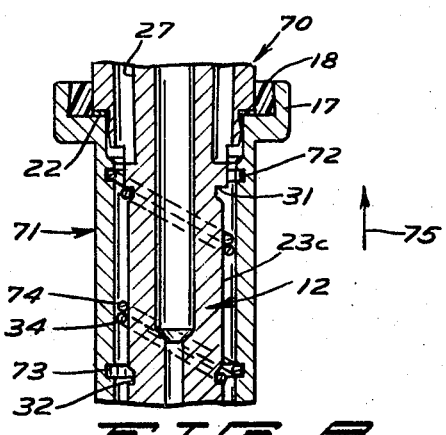
INVENTOR.
DENNIS A. STALBERGER
BY
Dugger Johnson & Westman
ATTORNEYS United States Patent Office 3,390,838
Patented July 2, 1968

3,390,838
TWO-PIECE TORCH TIP
Dennis A. Stalberger, Minneapolis, Minn., assignor to Tescom Corporation, Minneapolis, Minn., a corporation of Minnesota
Filed Jan. 10, 1966, Ser. No. 519,599
16 Claims. (Cl. 239—406)

ABSTRACT OF THE DISCLOSURE

A two-piece torch tip having a shell with an axial bore extending therethrough and an insert extended into the shell bore and seatable in said shell to, in cooperation therewith, form a fluid channel. The shell and insert have cooperating means extended across said channel for releasably holding the insert in the tip whereby the tip may be separated from the channel only by twisting the insert relative the shell, said cooperating means permitting fluid flow through the channel. The cooperating means, for example, comprises a protrusion on the shell and a spiral member in the insert, or a spiral member on each of the shell and the insert, that abut against one another for retaining the insert in the shell until the insert is twisted and then axially moved relative the shell.

---

This invention relates to a new and novel two-piece torch tip. More particularly this invention relates to a two-piece torch tip having an outer shell and a removable tip insert that can be twisted relative the shell and thereby locked in the shell without blocking a fluid passageway between the tip and shell.

In utilizing two-piece torch tips of the prior art, one of the problems encountered is that in removing the tip from a torch head, the tip insert separates from the shell; especially, when the tip is directed in an upwardly direction. Further, in utilizing testing apparatus for testing two piece torch tips of the prior art, a plurality of torch tips are held in the testing apparatus to point upwardly. After the testing is completed, utilization of automatic mechanism for ejecting the two piece tips from the testing apparatus frequently results in only the shell being removed, or the insert being separated from its respective shell. This is undesirable. Accordingly, this invention has been made.

An object of this invention is to provide a new and novel two-piece torch tip having a tip insert that locks in the torch shell upon twisting the tip relative the shell. Another object of this invention is to provide a new and novel two piece torch tip having a tip insert that is axially immovable relative the shell other than when the insert is also angularly movable relative the shell. An additional object of this invention is to provide a new and novel two-piece torch tip having an insert that removably locks in the shell and at the same time provides a better diffusion or mixing of the heating oxygen and fuel gas in the fluid passageway provided between the insert and the shell.

The invention is illustrated with reference to the accompanying drawings in which corresponding numerals refer to the same parts and in which:

FIGURE 1 is a longitudinal cross sectional view of the first embodiment of the torch tip of this invention, said view in dotted lines illustrating a portion of a conventional torch head and torch nut of a cutting, heating or welding torch;

FIGURE 2 is a transverse cross sectional view generally taken along the line and in the direction of the arrows 2—2 of FIGURE 1 to further illustrate the structure for removably locking the first embodiment of the torch tip in the torch shell;

FIGURE 3 is a fragmentary elevational view of the tip insert of FIGURE 1 to more clearly show the mounting of a spiral wire thereon;

FIGURE 4 is a fragmentary longitudinal cross sectional view of a second embodiment of the two-piece torch tip of this invention;

FIGURE 5 is a transverse cross sectional view generally taken along the line and in the direction of arrows 5—5 of FIGURE 4 to further illustrate the structure of the second embodiment for releasably locking a tip insert in the shell;

FIGURE 6 is a fragmentary longitudinal cross sectional view of a third embodiment of the two piece torch tip of this invention;

FIGURE 7 is a fragmentary elevational view of the tip insert of FIGURE 6 to more clearly show the integrally formed spiral ridge;

FIGURE 8 is a fragmentary longitudinal cross sectional view of a fourth embodiment of the two piece torch tip of this invention; and FIGURE 9 is a fragmentary longitudinal cross sectional view of the shell of FIGURE 8 to better illustrate the mounting of a spiral wire therein.

Each of the embodiments of the two-piece torch tip of this invention are utilizable with conventional torches. For example, the torch tip of this invention may be used with torches of the general nature set forth in U.S. Patents Nos. 2,702,079 and 3,076,494. As a result only a portion of torch head 13 and head nut 14 for mounting a two piece torch tip on the torch head is diagrammatically illustrated in FIGURE 1. It is to be understood that the torch head has appropriate passageways for supplying heating oxygen, cutting oxygen, and fuel gas to the appropriate passageways in the torch tip of this invention.

Referring now in particular to FIGURES 1–3, the first embodiment of the torch tip of this invention, generally designated 10, will now be described. The torch tip 10 includes an outer shell, generally designated 11, and a tip insert, generally designated 12.

The outer shell 11 is integrally formed and includes an enlarged collar 17, an axially elongated intermediate portion 19, and a tapered outward portion 20. Annular sealing material 18 is provided in the interior shoulder portion of the collar. The shell has a longitudinally elongated central bore 21 opening through either end thereof. The shell intermediate portion 19 has bore portion 21a that is of substantially a constant diameter throughout its longitudinal length other than as noted hereinafter, bore portion 21a being a part of bore 21.

The tip insert includes a main body 23 having a high pressure collar 24 threaded on one end thereof. A resilient seal member 25 is mounted in an annular groove provided by the main body and the high pressure collar. The main body has a central bore 26 extended axially therethrough.

The main body has an intermediate, longitudinally elongated portion 23a of enlarged transverse cross sectional area. The portion 23a forms a shoulder and has a resilient seal bearing against said shoulder to be seatable on the annular ledge of collar 17 that is adjacent sealing material 18; and when thus seated, the plurality of circumferentially spaced preheat oxygen passageways 27 extended through said portion their one ends open to bore 21 in the annular clearance space provided between adjacent portions of the tip insert and the shell as illustrated in FIGURE 1. The preheat oxygen passageways at their opposite ends open longitudinally between collar 24 and enlarged portion 23a. Portion 23a is also provided with a plurality of transverse ports 28 that at their one ends open to passageways 27 and at their opposite ends to an annular groove for conducting fuel gas from appropriate passageways (not shown) in the torch head to passageways 27. Portion 23a mounts on O-ring 29 for forming a fluid seal with the torch head to prevent mixing of the preheated oxygen and fuel gas in the space between the torch head and the insert.

The portion of the main body which is normally within bore 21 axially inwardly of the opening of passageways 27 to said bore has a first external annular groove 31, and a second external annular groove 32 substantially axially spaced from groove 31 and located more closely adjacent the axial end of bore portion 21a that is closest to the bore 21 discharge outlet 21b. The insert has an intermediate portion 23c that is of substantially constant diameter which is concentric to and radially opposite bore portion 21a. A spiral wire 34 is coiled around portion 23c of tip insert axially intermediate grooves 31, 32 and has one end portion bent radially inwardly into the groove 31 and an opposite end portion bent radially inwardly into the groove 32. As a result of bending opposite end portions of the wire 34 in the aforementioned manner, the wire is held against axial displacement relative the insert. The wire 34 may be, for example, coiled one and a half turns around the insert. Advantageously the wire may be of stainless steel, and spring tempered.

To cooperate with the wire 34 of retaining the insert against axial displacement, the shell has a dimple 11b that extends into the otherwise normal clearance space between the shell and the insert. As may be noted from FIGURE 1, dimple 11b is located axially intermediate opposite ends of the otherwise constant diameter portion 21a, is radially spaced from the insert when the insert is seated in the shell and extends arcuately along the inner periphery of bore 21 a small fraction of the circumferential dimension of the inner peripheral wall of the shell that defines the adjacent portion of bore 21. Further the dimension of the dimple in an axial direction is many times lesser than the corresponding dimension between axially adjacent portions of the adjacent coils of the wire 34.

The insert main body has a plurality of circumferentially spaced vanes 23d for centering the discharge one end portion of the insert in the convergingly tapered portion of bore 21, and at the same time cooperating with the shell to form a plurality of fluid passageways for conducting fluid discharging from passageways 27 to outlet 21b. Also the insert has a portion 23b adjacent the enlarged collar 17 for centering the insert in the shell in the seated position.

Assuming the two piece torch tip has been separated from the torch and it is desired to remove the insert from the shell, by exerting an axial force on insert relative the shell in the direction of the arrow 38 and at the same time twisting the insert in the direction of the arrow 37, the insert may be separated from the shell. However, by only exerting a force in the direction of the arrow 38, the insert will not separate from the shell as the dimple overlays and abuts against the adjacent portion of wire 34. In order to reconnect the insert to the shell, the discharge end portion of insert is axially moved into the shell until the wire 34 abuts against the dimple 11b and thence the insert is turned in the direction opposite arrow 37 until vanes 23d stop further movement of the insert relative the shell in a direction opposite arrow 38 by abutting against the convergingly tapered end portion of bore 21.

It is to be noted that fluid discharging from passageways 27 into bore 21 will at least in part flow through a spiral path provided by wire 34 being located in bore 21 between the inner peripheral wall of the bore and the adjacent outer peripheral wall of the insert, and subsequently flow through the passageways provided by vanes 23d and the shell to outlet 21b.

The structure and use of the first embodiment of the invention having been set forth, the structure of the second embodiment, generally designated 50, will now be described. Referring to FIGURES 4 and 5, the second embodiment 50 includes a tip insert 23 and a spiral wire 34 of the same construction described with reference to the first embodiment. Also, the second embodiment includes a shell 51 of the same construction as the shell 11 other than as noted hereinafter. The shell 51 does not have a dimple 11b. Rather there is provided a peg 52 that extends through an appropriate aperture in the shell 51 to a position radially intermediate the inner peripheral wall portion of the shell and the outer peripheral wall portion of the insert when the insert is in a seated position. The peg extends into the constant diameter bore portion 51a and is attached at 53 (for example by silver solder) to the shell for retaining the peg in a fixed position relative the shell. Peg 52 performs the same function as the dimple 11b and accordingly it is believed that the usage of the second embodiment is obvious from the description set forth with reference to the first embodiment.

Referring now to FIGURES 6 and 7, the third embodiment of the invention, generally designated 60, will now be described. The embodiment 60 includes a shell 11 that is of the same construction as the shell described with reference to the first embodiment. Further, the third embodiment includes a tip insert, generally designated 61 that is of the same construction as the tip insert 12 of the first embodiment; except that the tip insert 61 does not include any annular grooves 31, 32. Further for the third embodiment, there is not provided a spiral wire 34. Rather the tip insert 61 has a spiral ridge 62 integrally joined to the axially intermediate, substantially constant diameter portion 63a of the main body of the tip insert. As may be noted in FIGURES 6 and 7, the spiral ridge extends radially outwardly of the otherwise constant diameter portions 63a of the main body, and is of about the same pitch as wire 34 and extends about 1½ times about the remainder of the insert. The ridge 62 performs the same function as the spiral wire 34 of the first embodiment; and accordingly, in view of the description set forth above it is believed the usage of the third embodiment is apparent.

Referring now to FIGURES 8 and 9, the fourth embodiment of the invention, generally designated 70, includes an insert 12 and a spiral wire 34 that are of identical construction to that described with reference to the first embodiment. Further embodiment 70 includes a shell 71 that is of the same construction as shell 11 other than shell 71 does not have a dimple 11b, and is provided with axially spaced, internal grooves 72, 73. As may be noted from FIGURE 8, groove 72 in an axial direction is located slightly more adjacent the enlarged collar 17 than the tip insert groove 31 when the tip insert is in a seated position; while groove 73 is located slightly axially more closely adjacent collar 17 than the groove 32. There is provided a spiral wire 74 that is mounted in the central bore 75 of the shell 71, the spiral wire having one end portion 74a bent radially outwardly to extend into the adjacent portion of the groove 72 and an opposite end portion 74b bent radially outwardly to extend into adjacent portions of groove 73. The portions of bore 75 axially between grooves 72, 73 and for a distance on opposite sides of said grooves are of substantially constant diameter and concentric to insert portion 23c when the insert is seated in the shell. A remaining intermediate portion 74c of the spiral wire bears against the inner peripheral wall of the shell, the bent edge portions 74a, 74b extending into the respective grooves holding the wire 74 against displacement relative the shell. Accordingly when the tip insert with its spiral wire 34 is removed from the shell, the spiral wire 74 remains in place in the shell as is in part illustrated in FIGURE 9.

The spiral wire 74 is coiled in the same direction as the spiral wire 34 (for example, both wires 34 and 74 are righthand coiled). Further both spirals have substantially the same degree of pitch whereby with the insert 12 seated in the shell 71, the major length of wire 34 is in abutting engagement with the wire 74; while a portion of wire 34 abutting against wire 74 is located more axially remote from the enlarged collar 17 than the portion of wire 74 against which it abuts. Accordingly, when it is desired to remove the insert 12 from the shell 71, the insert is turned relative the shell (in the direction of the arrow 37 such as illustrated for the first embodiment) until no portion of the wire 34 abuts against wire 74. Then the insert may be moved axially in the direction of arrow 75 so that the insert is completely separated from the shell. However, merely exerting a force on the insert relative the shell in the direction of arrow 75 when the insert is seated in the shell will not separate them. The spiral wires 34, 74 in abutting against one another provide a passageway for fluid within the bore 21 from one axial end of said wires to the other.

With reference to each of the embodiments of the invention when the respective insert is seated in the shell, merely shaking or jarring the insert and shell will not cause the insert to separate from the shell. Rather in each embodiment the insert has to be twisted relative the shell to separate them. Accordingly, in each embodiment the insert is removably locked in the shell even though the insert and shell are not attached to a torch head.

Also in each embodiment of the invention the axial thickness of the insert spiral member is many times less than the axial distance between axial portions of the same turn of said spiral member. For example as shown in FIGURE 7 for the third embodiment, the axial thickness T of ridge 62 is many times less than the axial distance L between one turn of the spiral. Further the axis A—A of coiling for each embodiment (only shown for the third embodiment) extends axially within the bore of the shell when the respective insert is seated in the shell.

As many widely apparently different embodiments of this invention may be made without departing from the spirit and scope thereof, it is to be understood that I do not limit myself to the specific embodiments herein.

What I claim is:

1. A torch tip comprising an axially elongated torch shell having a first end portion, an intermediate portion and a discharge end portion, said shell having an axially extending bore opening through the aforementioned end portions, said bore having a substantially constant diameter portion in said intermediate portion, and a tip insert having an axially extending portion extendable into said bore and that has an outer wall portion that in conjunction with said shell forms a fluid passageway extending from adjacent said first end portion to said discharge end portion, said shell and insert having cooperating means extending radially across said bore for removably locking said insert in said shell while permitting fluid flow through said passageway, said cooperating means comprising a protrusion joined to said constant diameter portion to extend radially at least partially across said bore and means joined to said insert wall portion to extend toward the shell for abutting against the protrusion to lock the insert in the shell and at the same time permitting removal of the insert from the shell by only initially twisting the insert relative the shell.

2. A torch tip comprising an axially elongated shell having a first end portion and a discharge end portion, said shell having an axially extending bore opening through the aforementioned end portions, and a tip insert having an axially extending portion extendable into said bore and that has an outer wall portion that in conjunction with said shell forms a fluid passageway extending from adjacent said first end portion to said discharge end portion, said shell and insert having cooperating means extending radially across said bore for removably locking said insert in said shell while permitting fluid flow through said passageway, said cooperating means including a spiral member extending radially adjacent the shell inner peripheral wall defining said bore and having an axially elongated coil axis.

3. The apparatus of claim 2 further characterized in that said spiral member has more than one spiral turn, and is of an axial thickness that is many times less than the axial distance between axially adjacent portions of one turn.

4. The apparatus of claim 3 further characterized in that said shell has an axially elongated, substantially constant inner diameter portion and that said cooperating mens includes means joined to said shell to abut against said spiral member to permit removal of the insert from the shell only by initially twisting the insert relative the shell.

5. A torch tip comprising an axially elongated shell having a first end portion and a discharge end portion, said shell having an axially extending bore opening through the aforementioned end portions, and a tip insert having an axially extending portion extendable into said bore and that has an outer wall portion that in conjunction with said shell forms a fluid passageway extending from adjacent said first end portion to said discharge end portion, said shell having substantially a constant inner diameter portion and said insert when seated in the shell having an intermediate portion radially spaced from said constant diameter portion, said shell and insert having cooperating means extending radially across said bore for removably locking said insert in said shell while permitting fluid flow through said passageway, said cooperating means comprising a protrusion joined to said constant diameter portion to extend radially at least partially across said bore and a spiral member on said intermedite portion to coact with said protrusion to permit removal of the insert from the shell by only initially twisting the insert relative the shell.

6. The apparatus of claim 5 further characterized in that said protrusion comprises a dimple integrally joined to said constant diameter portion.

7. The apparatus of claim 5 further characterized in that said protrusion comprises a peg fixedly attached to said constant diameter portion.

8. The apparatus of claim 5 further characterized in that said spiral member comprises a spiral ridge integrally joined to said constant diameter portion.

9. The apparatus of claim 5 further characterized in that said protrusion comprises a spiral wire mounted in said bore in a fixed axial position relative said constant diameter portion.

10. The apparatus of claim 5 further characterized in that said spiral member comprises a spiral wire mounted on said intermediate portion.

11. A torch tip comprising an axially elongated torch shell having a first end portion and a second end portion, said shell having a central bore extending therethrough and an elongated tip insert having an end portion of enlarged cross section seatable against said first end portion in fluid sealing engagement therewith, and an axially intermediate portion and an opposite end portion located in said bore and providing a clearance space with the shell inner peripheral wall defining said bore when the said enlarged end portion is thus seated, said enlarged portion in a seated condition having a fluid passageway opening to said clearance space, said first end portion comprising an enlarged collar having a transverse annular surface against which said insert seats, and coacting means respectively joined to said shell to protrude into said clearance space and joined to said intermediate portion for removably retaining the insert opposite end adjacent said second end portion and permitting fluid flow through said clearance space, said coacting means comprising an axially elongated spiral member extending radially between said shell and intermediate portion, and having an axial thicknes many times less than the pitch of spiral.

12. The apparatus of claim 11 further characterized in that said intermediate portion has a pair of axially spaced, external grooves and that said spiral member comprises a wire having opposite end portions extending into the respective groove to hold the wire against axial displacement relative the insert.

13. The apparatus of claim 11 further characterized in that said coacting means includes a dimple integrally joined to said shell to extend radially inwardly.

14. A torch tip comprising an axially elongated shell having an enlarged collar portion, an intermediate portion and a discharge end portion, said shell having a bore extended axially therethrough, said bore having a substantially constant diameter portion in said intermediate portion, an enlarged diametric portion within said collar portion and a convergingly tapered portion within said discharge end portion that is of progressively decreasing diameters in an axial direction away from said shell intermediate portion, and a tip insert having an enlarged diametric end portion extendable in said collar portion to form a fluid seal with said collar, an intermediate portion extendable into said bore to be generally concentric to said shell intermediate portion in radial spaced relationship thereto, and opposite end portion having circumferentially spaced vanes seatable against the shell inner peripheral wall defining said tapered bore portion, said insert having a central bore extending axially therethrough and fluid passageways in said insert enlarged diametric portion opening to the shell bore axially more adjacent the shell discharge end portion than the collar portion and radially between the shell and the radially adjacent portion of the insert, said shell intermediate portion having a protrusion extending radially inwardly, and said insert intermediate portion having thereon axially elongated, radially outwardly extending spiral means for cooperating with said protrusion to removably retain the insert relative the shell in a position wherein the vanes seat in the bore against said shell discharge portion while forming a spiral fluid passageway portion between the shell and insert intermediate portions within said bore, and at the same time permitting separating the insert from the shell by twisting the insert relative the shell.

15. The apparatus of claim 14 further characterized in that said spiral means comprises a wire mounted on said insert intermediate portion.

16. The apparatus of claim 14 further characterized in that said spiral means comprises a spiral ridge integrally joined to said insert intermediate portion.

References Cited

UNITED STATES PATENTS

| 2,072,281 | 3/1937 | Simonin | 239—405 |
| 2,623,577 | 12/1952 | Cowles | 239—406 |
| 2,854,067 | 9/1958 | Cairns | 158—27.4 |
| 2,881,826 | 4/1959 | Spies | 239—600 X |

FOREIGN PATENTS 1,143,457  2/1963  Germany.

M. HENSON WOOD, JR., *Primary Examiner.*

V. M. WIGMAN, *Assistant Examiner.*